United States Patent
Yokota et al.

(10) Patent No.: US 11,295,429 B2
(45) Date of Patent: Apr. 5, 2022

(54) IMAGING ABNORMALITY DIAGNOSIS DEVICE

(71) Applicants: TOYOTA JIDOSHA KABUSHIKI KAISHA, Toyota (JP); DENSO CORPORATION, Kariya (JP)

(72) Inventors: Masataka Yokota, Tokyo (JP); Jia Sun, Tokyo (JP); Takahiro Sota, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 16/690,250

(22) Filed: Nov. 21, 2019

(65) Prior Publication Data

US 2020/0167906 A1 May 28, 2020

(30) Foreign Application Priority Data

Nov. 26, 2018 (JP) .............................. JP2018-220646

(51) Int. Cl.
| | |
|---|---|
| *G06T 7/00* | (2017.01) |
| *G06K 9/00* | (2006.01) |
| *B60R 11/04* | (2006.01) |
| *G05D 1/02* | (2020.01) |
| *B60Q 9/00* | (2006.01) |

(52) U.S. Cl.
CPC .............. *G06T 7/0002* (2013.01); *B60Q 9/00* (2013.01); *B60R 11/04* (2013.01); *G05D 1/0246* (2013.01); *G06K 9/00798* (2013.01); *G06T 2207/30168* (2013.01); *G06T 2207/30256* (2013.01)

(58) Field of Classification Search
CPC ........ G06T 7/0002; G06T 2207/30256; B60Q 9/00; B60R 11/04; G05D 1/0246; G06K 9/00789
See application file for complete search history.

(56) References Cited

U.S. PATENT DOCUMENTS

| | | | |
|---|---|---|---|
| 10,077,050 B2* | 9/2018 | Rajvanshi | ............ B60W 30/14 |
| 2015/0055831 A1* | 2/2015 | Kawasaki | ............ G06K 9/4638 |
| | | | 382/104 |
| 2015/0161457 A1* | 6/2015 | Hayakawa | ............ G08G 1/166 |
| | | | 348/46 |
| 2015/0371096 A1* | 12/2015 | Stein | ............ G06K 9/00798 |
| | | | 382/103 |
| 2016/0001781 A1* | 1/2016 | Fung | ............ B60K 28/02 |
| | | | 701/36 |
| 2016/0047895 A1* | 2/2016 | Dussan | ............ G01S 17/87 |
| | | | 356/4.01 |
| 2016/0132705 A1* | 5/2016 | Kovarik | ............ G06K 7/10376 |
| | | | 340/10.3 |

(Continued)

FOREIGN PATENT DOCUMENTS

JP         2013-196341 A         9/2013

*Primary Examiner* — Santiago Garcia
(74) *Attorney, Agent, or Firm* — Dickinson Wright, PLLC

(57) ABSTRACT

An imaging abnormality diagnosis device includes one or more processors configured to: detect a lane line in an image of a road surface captured by a camera mounted on a vehicle; estimate a shape of a road on which the vehicle is traveling, based on an output of a detector mounted on the vehicle, the detector being other than the camera; and detect as a distorted area an area in the image where the shape of the road and a shape of the lane line do not coincide with each other.

10 Claims, 7 Drawing Sheets

(56) References Cited

U.S. PATENT DOCUMENTS

| | | | |
|---|---|---|---|
| 2017/0261327 A1* | 9/2017 | Olsson | G06K 9/00798 |
| 2018/0022347 A1* | 1/2018 | Myers | G01S 17/86 |
| | | | 701/26 |
| 2019/0031205 A1* | 1/2019 | Naserian | B60W 10/20 |
| 2019/0130182 A1* | 5/2019 | Zang | G06K 9/00651 |
| 2019/0146489 A1* | 5/2019 | Zaizen | B60W 40/08 |
| | | | 701/42 |
| 2019/0329768 A1* | 10/2019 | Shalev-Shwartz | |
| | | | G01C 21/3602 |
| 2020/0064855 A1* | 2/2020 | Ji | G05D 1/0246 |
| 2020/0160068 A1* | 5/2020 | Silver | G01C 21/3833 |
| 2020/0302189 A1* | 9/2020 | Shu | G06N 3/08 |
| 2020/0302191 A1* | 9/2020 | Nomura | G01C 21/32 |

* cited by examiner

IMAGING ABNORMALITY DIAGNOSIS DEVICE

INCORPORATION BY REFERENCE

The disclosure of Japanese Patent Application No. 2018-220646 filed on Nov. 26, 2018 including the specification, drawings and abstract is incorporated herein by reference in its entirety.

BACKGROUND

1. Technical Field

The present disclosure relates to an imaging abnormality diagnosis device.

2. Description of Related Art

In recent years, many vehicles are provided with an in-vehicle camera that images surroundings of the vehicle. Such an in-vehicle camera is, for example, used in a lane keeping system that, based on information of a lane line on a road detected from a captured image, assists a steering operation so that the vehicle can travel in a lane, or a lane departure warning system that, based on such lane line information, warns a driver when the vehicle approaches a lane line (e.g. Japanese Unexamined Patent Application Publication No. 2013-196341 (JP 2013-196341 A)).

SUMMARY

Incidentally, when a local flaw or stain exists on a camera cover, such as a glass cover, provided in front of the in-vehicle camera, there is a possibility that an image captured by the in-vehicle camera has a distorted area where local distortion of the image is generated. Since such a distorted area cannot accurately show the state outside the vehicle, when estimation of a lane line or the like is performed relying on information of the image having the distorted area, there is a possibility that an error occurs in the estimation of the lane line or the like. As a result, a proper steering operation by the lane keeping system, a proper warning by the lane departure warning system, or the like is not performed. Therefore, it is necessary to properly diagnose whether or not an abnormality such as a distorted area exists in an image captured by the in-vehicle camera.

The present disclosure provides an imaging abnormality diagnosis device that can properly diagnose an abnormality such as a distorted area in an image captured by an in-vehicle camera.

An imaging abnormality diagnosis device according to a first aspect of the present disclosure includes: one or more processors; and a memory device storing instructions that are executable by the processors and that causes the processors to detect a lane line in an image of a road surface captured by a camera mounted on a vehicle, estimate a shape of a road on which the vehicle is traveling based on an output of a detector mounted on the vehicle, the detector being other than the camera, and detect, as a distorted area, an area in the image where the shape of the road and a shape of the lane line do not coincide with each other.

An imaging abnormality diagnosis device according to a second aspect of the present disclosure includes one or more processors configured to: detect a shape of a lane line in an image of a road surface ahead of or behind a vehicle, the image captured by an in-vehicle camera; estimate a shape of a road on which the vehicle is traveling, based on an output of a detector other than the in-vehicle camera; and detect an area in the image where the shape of the road and the shape of the lane line do not coincide with each other, the area detected as a distorted area where local distortion is generated in the image.

According to the present disclosure, it is possible to properly diagnose an abnormality such as a distorted area in an image captured by an in-vehicle camera.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
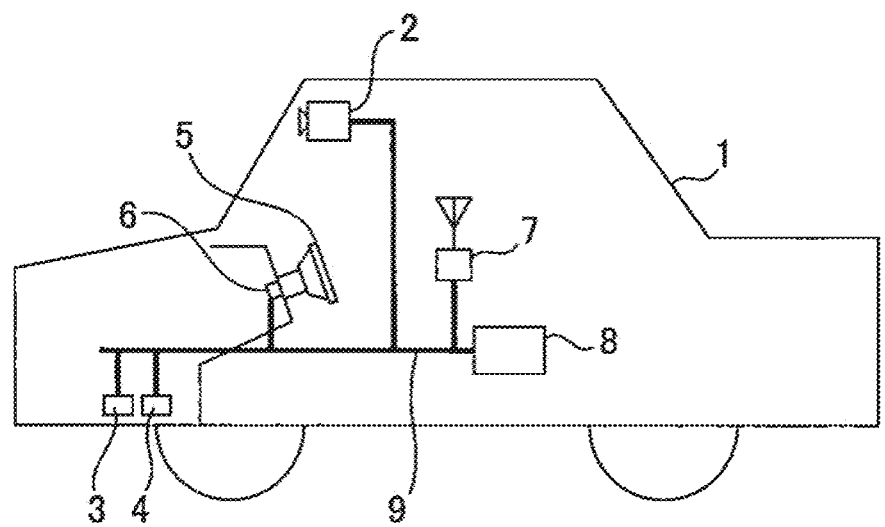
FIG. 1 is a diagram schematically illustrating the configuration of a vehicle on which an imaging abnormality diagnosis device is mounted.

Hereinafter, referring to the drawings, an imaging abnormality diagnosis device according to an embodiment will be described in detail. In the following description, the same reference numerals will be assigned to like elements.

Configuration of Vehicle

FIG. 1 is a diagram schematically illustrating the configuration of a vehicle on which an imaging abnormality diagnosis device according to this embodiment is mounted. As illustrated in FIG. 1, a vehicle 1 includes an in-vehicle camera 2, an acceleration sensor 3, a yaw rate sensor 4, a steering wheel 5, a steering angle sensor 6, a GPS receiver 7, and an electronic control unit (ECU) 8. The in-vehicle camera 2, the acceleration sensor 3, the yaw rate sensor 4, the steering wheel 5, the steering angle sensor 6, the GPS receiver 7, and the ECU 8 are communicably connected to each other via an in-vehicle network 9 conforming to a standard such as a controller area network (CAN).

The in-vehicle camera 2 images a predetermined range around a vehicle and produces an image of that range. The in-vehicle camera 2 includes a lens and an imaging element and is, for example, a complementary metal oxide semiconductor (CMOS) camera or a charge-coupled device (CCD) camera.

In this embodiment, the in-vehicle camera 2 is provided in the vehicle 1 and images surroundings of the vehicle 1. Specifically, the in-vehicle camera 2 is disposed inward of a front window of the vehicle 1 and images a front area ahead of the vehicle 1. For example, the in-vehicle camera 2 is disposed at an upper middle portion of the front window of the vehicle 1. The front window serves as a camera cover that protects the lens of the in-vehicle camera 2.

While an ignition switch of the vehicle 1 is on, the in-vehicle camera 2 images a front area ahead of the vehicle 1 at a predetermined imaging time interval (e.g. 1/30 seconds to 1/10 seconds) and produces an image of the front area. The image produced by the in-vehicle camera 2 is transmitted from the in-vehicle camera 2 to the ECU 8 via the in-vehicle network 9. The image produced by the in-vehicle camera 2 may be a color image or a gray image. The in-vehicle camera 2 may be provided to image a rear area behind the vehicle 1.

The acceleration sensor 3 detects an acceleration generated in the vehicle 1. In this embodiment, the acceleration sensor 3 can detect longitudinal, lateral, and vertical accelerations of the vehicle 1. The yaw rate sensor 4 detects an angular acceleration (yaw rate) at which the vehicle 1 rotates around the vertical axis. The acceleration sensor 3 and the yaw rate sensor 4 are attached to a body of the vehicle 1 at arbitrary positions. The acceleration sensor 3 and the yaw rate sensor 4 are not necessarily separate sensors, but may be a single integrated sensor that detects the acceleration and yaw rate.

The steering wheel 5 is provided at a driver's seat of the vehicle 1 and configured to change the direction of front wheels of the vehicle 1 when turned by a driver. The steering angle sensor 6 detects a turning angle of the steering wheel 5. Given that a steering angle of the steering wheel 5 corresponding to a direction of the front wheels that causes the vehicle 1 to travel straight is a zero degree, the steering angle sensor 6 outputs a current angle of the steering wheel 5 with respect to the zero-degree steering angle of the steering wheel 5. The acceleration sensor 3, the yaw rate sensor 4, and the steering angle sensor 6 respectively transmit signals to the ECU 8 via the in-vehicle network 9.

The GPS receiver 7 is a device for receiving signals from three or more GPS satellites to detect a current position of the vehicle 1 (e.g. the latitude and longitude of the vehicle 1). The GPS receiver 7 transmits the detected current position information of the vehicle 1 to the ECU 8.

The ECU 8 functions as an imaging abnormality diagnosis device that diagnoses an abnormality in imaging performed by the in-vehicle camera 2. In addition, the ECU 8 may also be configured to function as a driving assistance device that performs a driving assistance process based on an image captured by the in-vehicle camera 2. As the driving assistance process, it is conceivable, for example, to assist a steering operation so that the vehicle 1 can travel in a lane, or to warn the driver when the vehicle 1 approaches a lane line. Alternatively, the ECU 8 may control the vehicle 1 so that the vehicle 1 is fully or partially autonomously driven based on an image captured by the in-vehicle camera 2.

Figure 2:
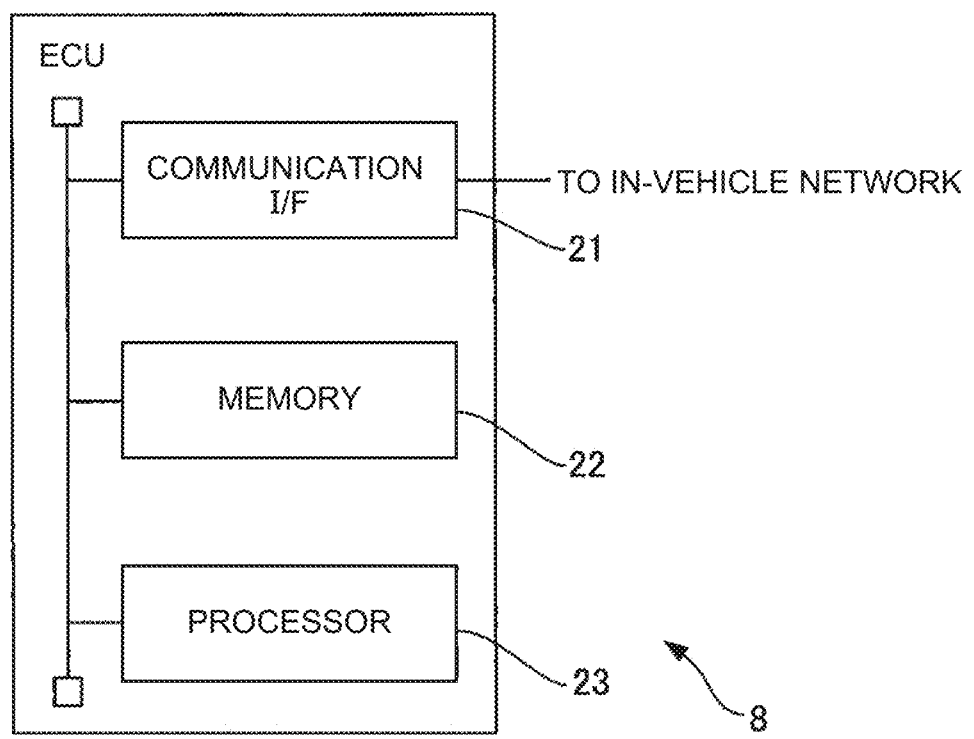
FIG. 2 is a hardware configuration diagram of an ECU.

FIG. 2 is a hardware configuration diagram of the ECU 8. As illustrated in FIG. 2, the ECU 8 includes a communication interface 21, a memory 22, and a processor 23. The communication interface 21 and the memory 22 are connected to the processor 23 via signal lines.

The communication interface 21 includes an interface circuit for connecting the ECU 8 to the in-vehicle network 9. That is, the communication interface 21 is connected to the in-vehicle camera 2, the acceleration sensor 3, the yaw rate sensor 4, the steering angle sensor 6, and the GPS receiver 7 via the in-vehicle network 9. The communication interface 21 receives an image from the in-vehicle camera 2 and transmits the received image to the processor 23. Simultaneously, the communication interface 21 receives acceleration information, yaw rate information, and steering angle information of the vehicle 1 respectively from the acceleration sensor 3, the yaw rate sensor 4, and the steering angle sensor 6 and transmits the received information to the processor 23.

The memory 22 includes, for example, a volatile semiconductor memory and a nonvolatile semiconductor memory. The memory 22 stores various data and the like that are used when the processor 23 performs various processes. For example, the memory 22 stores images received from the in-vehicle camera 2, information about the shapes of lane lines which will be described later, and map information. Further, the memory 22 stores computer programs that enable the processor 23 to perform various processes.

The processor 23 includes one or more central processing units (CPUs) and a peripheral circuit thereof. The processor 23 may further include a graphics processing unit (GPU). While the ignition switch of the vehicle 1 is on, the processor 23 performs an imaging abnormality diagnosis process every time the processor 23 receives an image from the in-vehicle camera 2. The processor 23 may further include another arithmetic circuit such as a logical operation unit or a numerical operation unit.

The processor 23 may be configured to perform a vehicle control process that controls the vehicle 1 so that the vehicle 1 is autonomously driven based on an image captured by the in-vehicle camera 2.

Imaging Abnormality Detection Process

Figure 3:
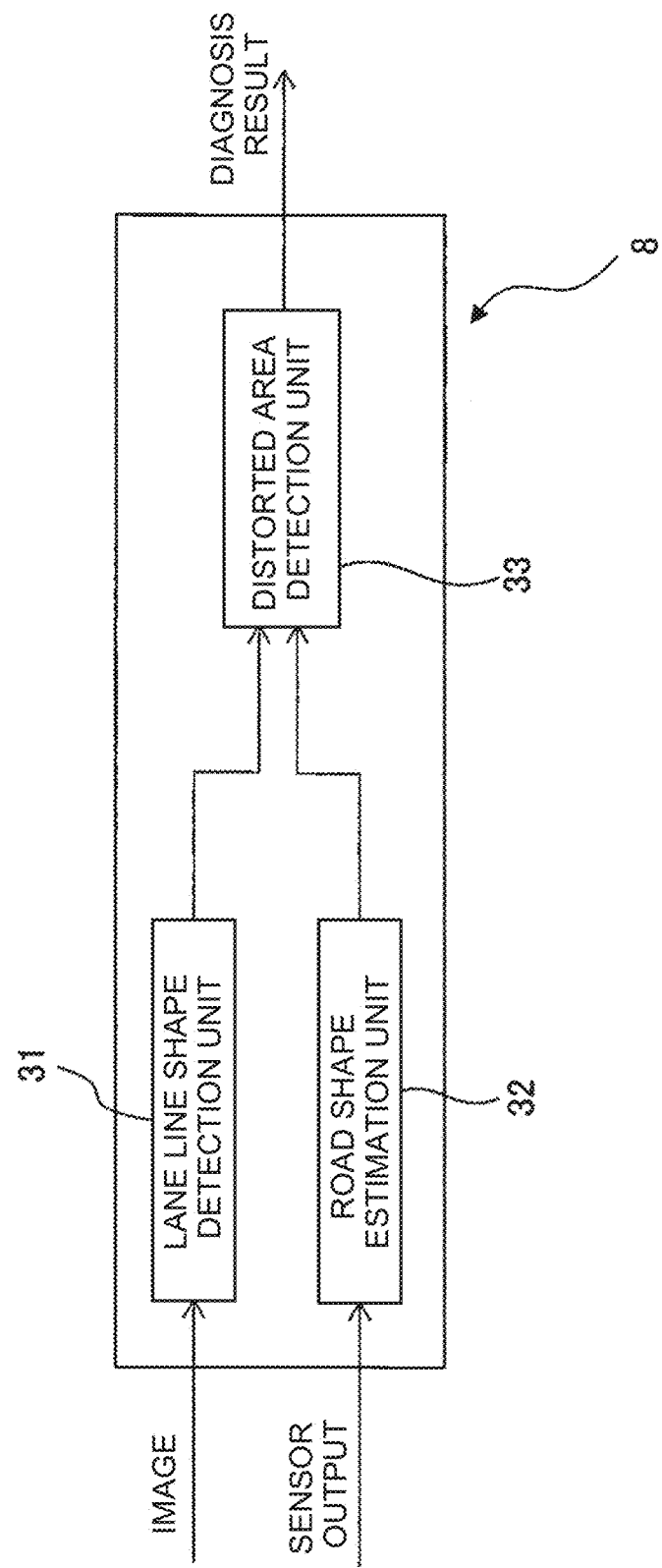
FIG. 3 is a functional block diagram of the ECU relating to an imaging abnormality detection process.

FIG. 3 is a functional block diagram of the ECU 8 relating to an imaging abnormality detection process. The ECU 8 includes a lane line shape detection unit 31, a road shape estimation unit 32, and a distorted area detection unit 33. These functional blocks of the ECU 8 are, for example, functional modules that are realized by computer programs that operate on the processor 23. These functional blocks may be dedicated arithmetic circuits provided in the processor 23.

The lane line shape detection unit 31 detects a shape of a lane line in an image of the road surface ahead of the vehicle 1 captured by the in-vehicle camera 2. An image captured by the in-vehicle camera 2 is input to the lane line shape detection unit 31 at the predetermined imaging time interval. The lane line shape detection unit 31 detects a lane line shown in the input image by a later-described lane line shape detection process. The lane line shape detection unit 31 outputs a shape of the lane line per each of areas defined in the image where the lane 102 is shown.

Figure 4:
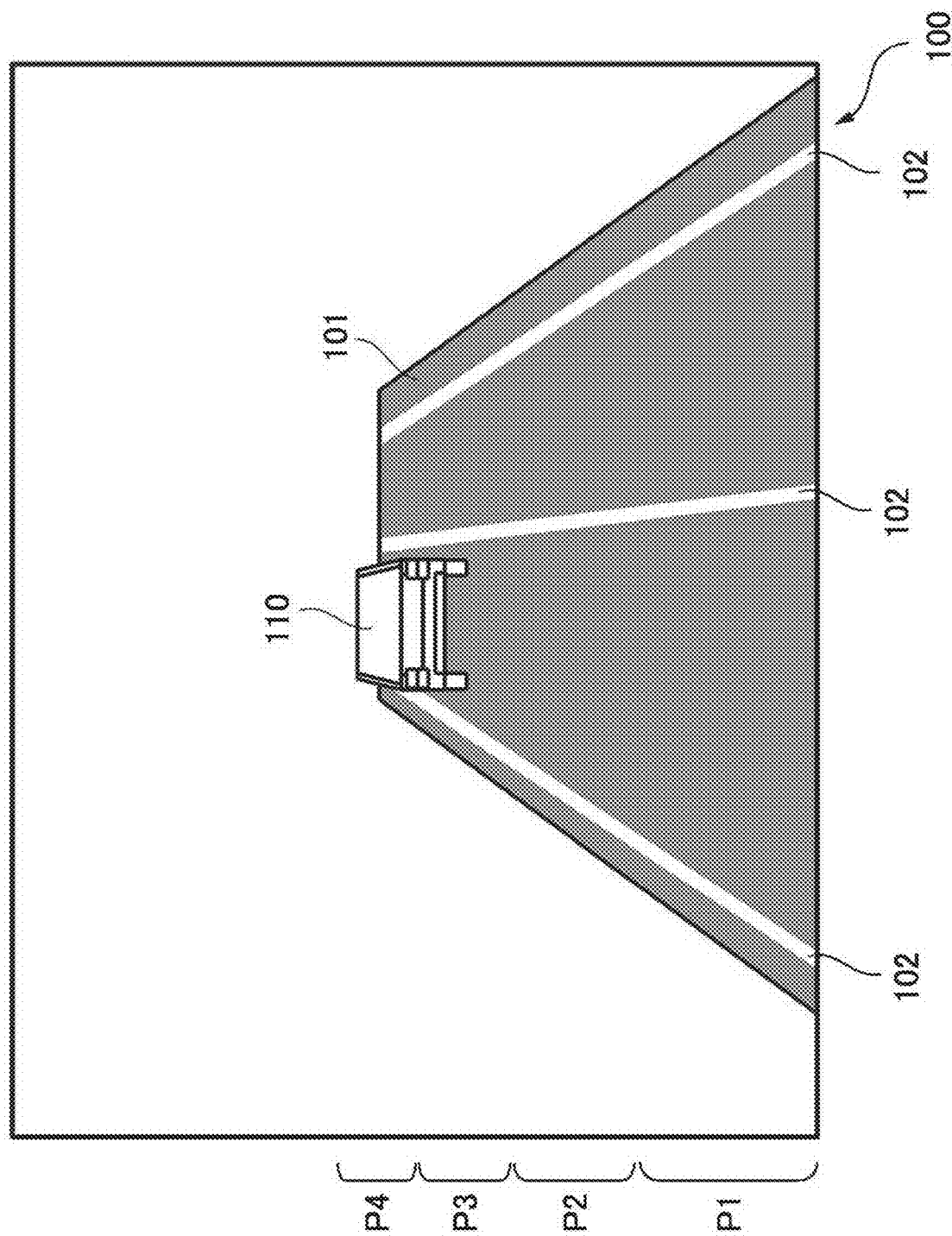
FIG. 4 is a diagram illustrating an example of an image captured by an in-vehicle camera.

FIG. 4 is a diagram illustrating an example of an image captured by the in-vehicle camera 2. In the example illustrated in FIG. 4, in order to facilitate understanding of the content, only a road 101 and a vehicle 110 on the road 101 are shown in a captured image 100.

In the example illustrated in FIG. 4, three lane lines 102 are shown in the image 100. In particular, in the example illustrated in FIG. 4, the lane lines 102 shown in the image 100 are all straight. Therefore, the lane line shape detection unit 31 outputs that the shape of the lane line 102 is straight in each areas defined in the image where the lane is shown.

Figure 5:
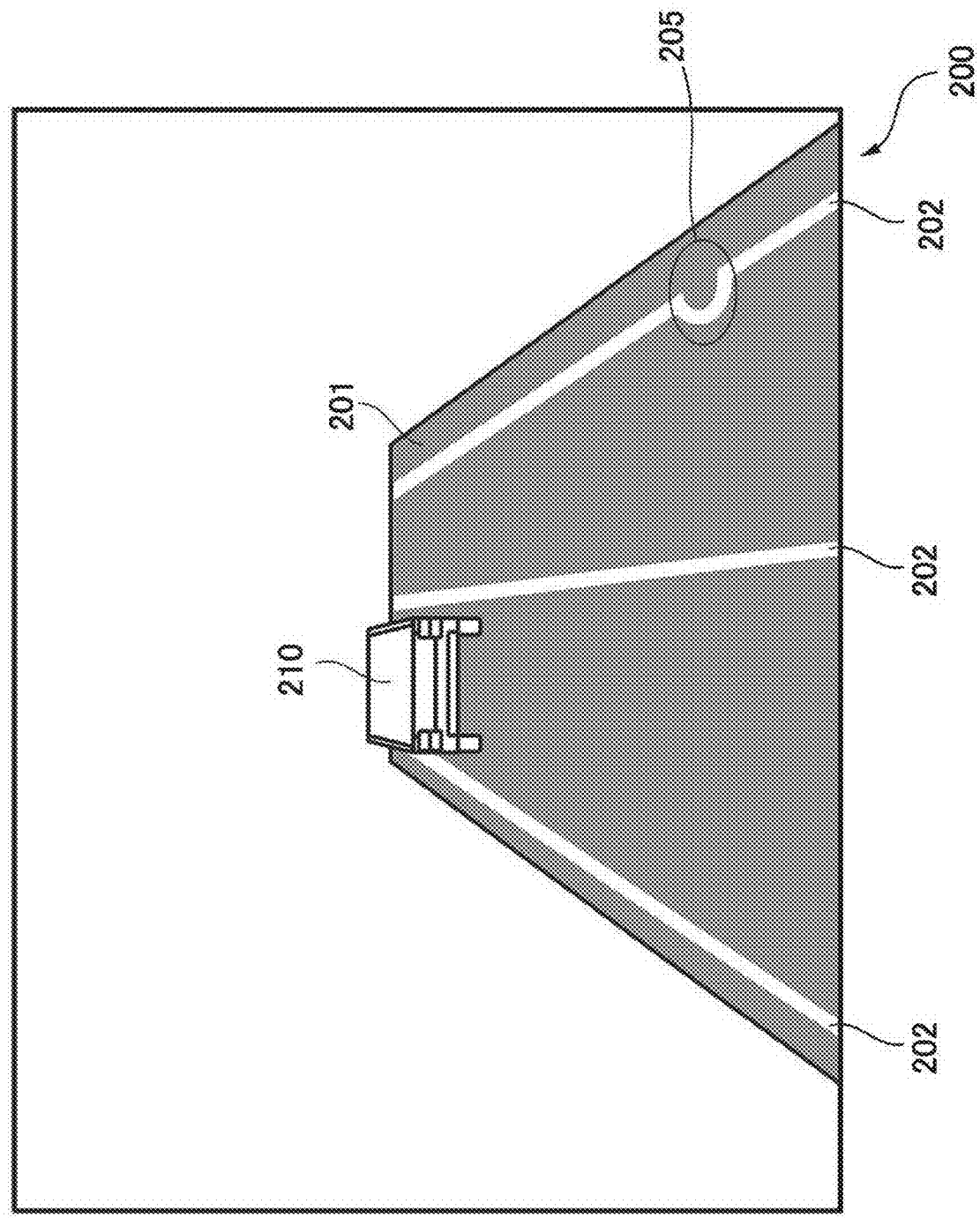
FIG. 5 is a diagram, similar to FIG. 4, illustrating an example of an image captured by the in-vehicle camera.

FIG. 5 is a diagram, similar to FIG. 4, illustrating an example of an image captured by the in-vehicle camera 2. In particular, in the example illustrated in FIG. 5, an image 200 is captured when the situation around the vehicle 1 is the same as when the image illustrated in FIG. 4 is captured. Therefore, lane lines 202 shown in the image 200 are basically straight.

However, the example illustrated in FIG. 5 illustrates a case where local distortion is generated in an area 205 of the image 200 due to the presence of a flaw in the front window provided in front of the in-vehicle camera 2. The distorted area 205 is located on one of the lane lines 202 shown in the image 200. As a result, in the example illustrated in FIG. 5, the lane line 202 is shown to be curved in the distorted area 205 of the image 200. Therefore, the lane line shape detection unit 31 outputs that the lane line 202 shown in the image is curved in the distorted area 205, and further outputs the curvature of the lane line 202 in the distorted area 205. In addition, the lane line shape detection unit 31 outputs that the shapes of the lane lines 202 are straight in the areas other than the distorted area 205.

Based on the output of a detector other than the in-vehicle camera 2, the road shape estimation unit 32 estimates a shape of a road on which the vehicle is traveling. As the detector other than the in-vehicle camera 2, it is possible to use various detectors that can be used to estimate the shape of the road. Specifically, as such a detector, the acceleration sensor 3, the yaw rate sensor 4, the steering angle sensor 6, or the GPS receiver 7, for example, is used. These sensors are merely examples, and another detector may alternatively be used as long as it can be used to estimate the shape of the road.

When the acceleration sensor 3 is used as the detector, the road shape estimation unit 32 estimates a shape of a road on which the vehicle 1 is currently traveling, based on the lateral acceleration of the vehicle 1. When the lateral acceleration of the vehicle 1 is substantially zero, the road shape estimation unit 32 estimates that the shape of the road on which the vehicle 1 is currently traveling is straight. On the other hand, when the lateral acceleration of the vehicle 1 is not zero, the road shape estimation unit 32 estimates that the shape of the road on which the vehicle 1 is currently traveling is curved, and calculates a curvature of the curve based on the magnitude of the acceleration. Further, when the change amount of the lateral acceleration of the vehicle 1 is constant, the road shape estimation unit 32 estimates that the shape of the road on which the vehicle 1 is currently traveling is a clothoid shape.

When the yaw rate sensor 4 is used as the detector, the road shape estimation unit 32 estimates a shape of a road on which the vehicle 1 is currently traveling, based on the yaw rate of the vehicle 1. When the yaw rate of the vehicle 1 is substantially zero, the road shape estimation unit 32 estimates that the shape of the road on which the vehicle 1 is currently traveling is straight. On the other hand, when the yaw rate of the vehicle 1 is not zero, the road shape estimation unit 32 estimates that the shape of the road on which the vehicle 1 is currently traveling is curved, and calculates a curvature of the curve based on the magnitude of the yaw rate. Further, when the change amount of the yaw rate is constant, the road shape estimation unit 32 estimates that the shape of the road on which the vehicle 1 is currently traveling is a clothoid shape.

When the steering angle sensor 6 is used as the detector, the road shape estimation unit 32 estimates a shape of a road on which the vehicle 1 is currently traveling, based on the steering angle of the steering wheel 5. When the steering angle of the steering wheel 5 is substantially zero (the steering wheel 5 is set in the straight-ahead direction), the road shape estimation unit 32 estimates that the shape of the road on which the vehicle 1 is currently traveling is straight. On the other hand, when the steering angle of the steering wheel 5 is not zero, the road shape estimation unit 32 estimates that the shape of the road on which the vehicle 1 is currently traveling is curved, and calculates a curvature of the curve based on the magnitude of the steering angle. Further, when the change amount of the steering angle is constant, the road shape estimation unit 32 estimates that the shape of the road on which the vehicle 1 is currently traveling is a clothoid shape.

When the GPS receiver 7 is used as the detector, the road shape estimation unit 32 estimates a shape of a road on which the vehicle 1 is currently traveling, based on the current position of the vehicle 1 and the map information stored in the memory 22.

When estimating the shape of the road, only one or more of these detectors may be used. When the detectors are used, the shape of the road is estimated comprehensively from the detection results of the detectors. By using the detectors in this way, it is possible to enhance the estimation accuracy of the shape of the road.

The distorted area detection unit 33 detects, as a distorted area where local distortion is generated in the image, an area where the shape of the road estimated by the road shape estimation unit 32 and the shape of the lane line detected by the lane line shape detection unit 31 do not coincide with each other.

In this embodiment, the distorted area detection unit 33 makes a comparison between a shape of a lane line detected from a past image by the lane line shape detection unit 31 and a current road shape estimated by the road shape estimation unit 32. Specifically, the distorted area detection unit 33 makes a comparison between a shape of a lane line detected from each of portions of past images captured at different timings and a current road shape.

For example, the distorted area detection unit 33 makes a comparison between a current road shape estimated by the road shape estimation unit 32 and a shape of a lane line shown at a lowermost portion (portion P1 in FIG. 4) of an image captured a second ago. In addition, the distorted area detection unit 33 makes a comparison between the current road shape and a shape of a lane line shown at a second portion from the bottom (portion P2 in FIG. 4) of an image captured two seconds ago. Likewise, the distorted area detection unit 33 makes a comparison between the current road shape and a shape of a lane line shown at each of third and fourth portions from the bottom (portions P3, P4 in FIG. 4) of images captured three seconds ago and four seconds ago.

Note that an arbitrary position in an image captured by the in-vehicle camera 2 does not represent a position where the vehicle 1 is currently traveling, but represents a position where the vehicle 1 will travel in the future. Therefore, in this embodiment, the distorted area detection unit 33 makes a comparison between a current road shape and a shape of a lane line on a road, on which the vehicle 1 is currently traveling, that is detected from a past image.

In a comparison between a road shape estimated by the road shape estimation unit 32 and a shape of a lane line detected by the lane line shape detection unit 31, when local distortion is not generated in an image captured by the in-vehicle camera 2, both shapes coincide with each other. Therefore, for example, when the image illustrated in FIG. 4 is captured by the in-vehicle camera 2 while traveling on the straight road, the shape of the road and the shape of the lane line are both straight and thus coincide with each other. On the other hand, when the image illustrated in FIG. 5 is captured by the in-vehicle camera 2 while traveling on the straight road, the shape of the lane line shown in the distorted area 205 differs from the shape of the road. Therefore, the distorted area detection unit 33 determines that local distortion is generated in the area (the distorted area 205) of the image where the shape of the road and the shape of the lane line do not coincide with each other.

When a distorted area is detected by the distorted area detection unit 33, the ECU 8 does not use an image within the distorted area in any processes that are performed using an image of the in-vehicle camera 2. For example, when estimating a shape of a lane line shown in a far area of an image based on a shape of a lane line shown in a near area of the image as described in JP 2013-196341 A, an image (lane line) shown in a distorted area is not used for estimation of the lane line shown in the far area. When a distorted area is detected by the distorted area detection unit 33, an image within the distorted area is not used for recognition of a sign or road marking shown in an image. When a driving assistance process or autonomous driving is performed using an image of the in-vehicle camera 2, the driving assistance process or the autonomous driving is stopped upon detection of a distorted area by the distorted area detection unit 33. In addition, when a distorted area is detected by the distorted area detection unit 33, the ECU 8 may be configured to warn the driver via an arbitrary interface.

According to this embodiment, by making a comparison between a road shape estimated by the road shape estimation unit 32 and a shape of a lane line detected by the lane line shape detection unit 31 as described above, it is possible to properly diagnose an abnormality such as a distorted area in an image.

Specific Control

Figure 6:
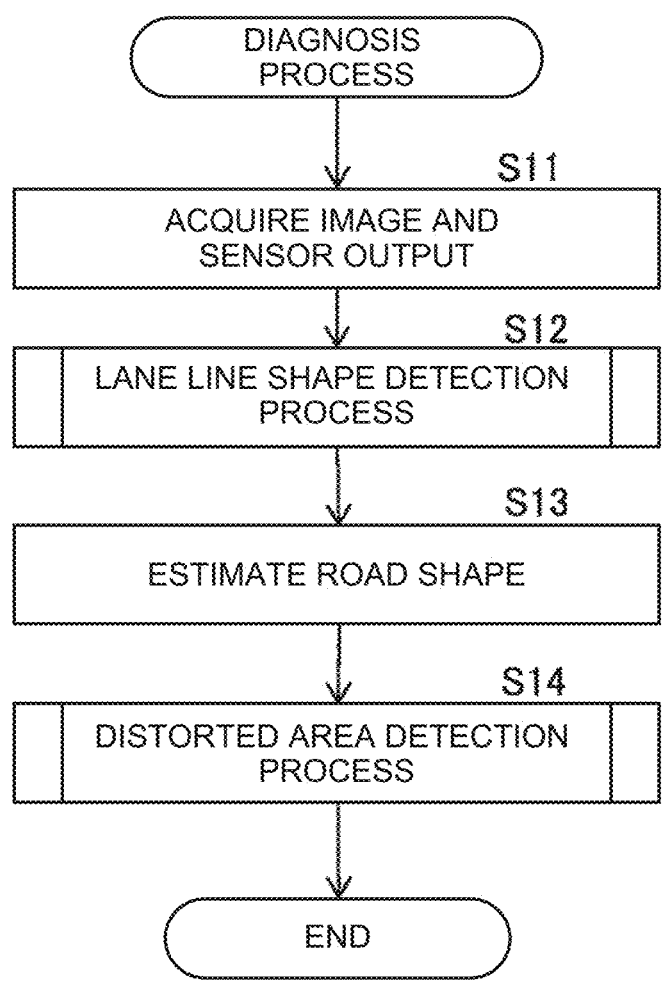
FIG. 6 is a flowchart illustrating an imaging abnormality diagnosis process.

Next, referring to FIGS. 6 to 8, an imaging abnormality diagnosis process will be described. FIG. 6 is a flowchart illustrating the imaging abnormality diagnosis process. The imaging abnormality diagnosis process illustrated in FIG. 6 is repeatedly performed by the processor 23 of the ECU 8 at a predetermined execution interval. The predetermined execution interval is, for example, an interval at which image information is transmitted from the in-vehicle camera 2 to the ECU 8.

First, at step S11, the ECU 8 acquires an image from the in-vehicle camera 2 via the communication interface 21. Likewise, the ECU 8 acquires a sensor output from at least one of the sensors via the communication interface 21. Specifically, the sensor output includes, for example, at least one of the outputs of the acceleration sensor 3, the yaw rate sensor 4, the steering angle sensor 6, and the GPS receiver 7.

Then, at step S12, the lane line shape detection unit 31 performs a lane line shape detection process that detects a shape of a lane line shown in the image. Specifically, by the lane line shape detection process, the shapes of the lane line shown in the image are detected. In this embodiment, the shape of the lane line shown at each of portions defined from bottom toward top of the image is detected. The information about the detected shapes of the lane line in the image is stored in the memory 22 for use in a future imaging abnormality diagnosis process.

Then, at step S13, the road shape estimation unit 32 estimates a shape of a road on which the vehicle 1 is currently traveling. As described above, the estimation of the road shape is performed based on at least one of the outputs of the acceleration sensor 3, the yaw rate sensor 4, the steering angle sensor 6, and the GPS receiver 7. Here, step S12 and step S13 may be interchanged.

Then, at step S14, the distorted area detection unit 33 performs a distorted area detection process that detects a distorted area where local distortion is generated in the image. The distorted area detection process is performed based on the shapes of the lane lines shown in the past images, calculated in the past lane line shape detection processes, and stored in the memory 22, and the road shape estimated by the road shape estimation unit 32. When the distorted area detection process for the distorted area detection has finished, the control routine is ended.

Figure 7:
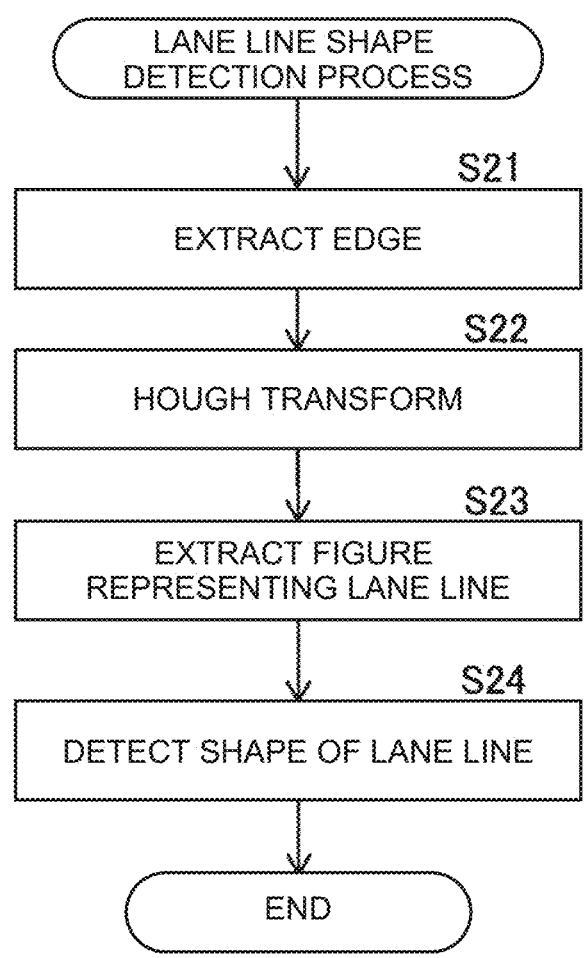
FIG. 7 is a flowchart illustrating a lane line shape detection process.

FIG. 7 is a flowchart illustrating the lane line shape detection process that is performed at step S12 in FIG. 6. The lane line shape detection process illustrated in FIG. 7 is performed every time the flowchart of FIG. 6 reaches step S12.

First, at step S21, the lane line shape detection unit 31 extracts edge components in the image acquired from the in-vehicle camera 2. In particular, in this embodiment, the lane line shape detection unit 31 extracts edge components in a road shown in the image. The edge extraction can be performed by various known techniques. Specifically, the edge components in the image are extracted by, for example, the Laplacian method, the Sobel method, or the Canny method. Consequently, a boundary between a lane line and the road is extracted as the edge components.

Then, at step S22, the lane line shape detection unit 31 detects figures of arbitrary shapes (straight lines, curved lines of arbitrary shapes, etc.) by the generalized Hough transform of the edge components extracted at step S21. Specifically, among figures of arbitrary shapes and positions, the figures for which the number of votes reaches a certain number or more are detected as the figures shown in the image.

Then, at step S23, from the many figures detected at step S22, the lane line shape detection unit 31 extracts the figure that represents the boundary between the lane line and the road. Specifically, for example, when the ratio of contrast or brightness on both sides of the arbitrary figure extracted at step S22 is a predetermined value or more, or when the extracted figure and another extracted figure are similar to each other and extend substantially in parallel to each other, the figure is extracted as the figure representing the boundary of the lane line.

Then, at step S24, based on the figure extracted at step S23 as the figure representing the boundary of the lane line, the lane line shape detection unit 31 detects a shape of the lane line. In this embodiment, the detection of the shape of the lane line is performed at each of the portions defined from bottom toward top of the image. The detected shapes of the lane line shown at the defined portions of the image are stored in the memory 22 along with the capturing time of the image.

Figure 8:
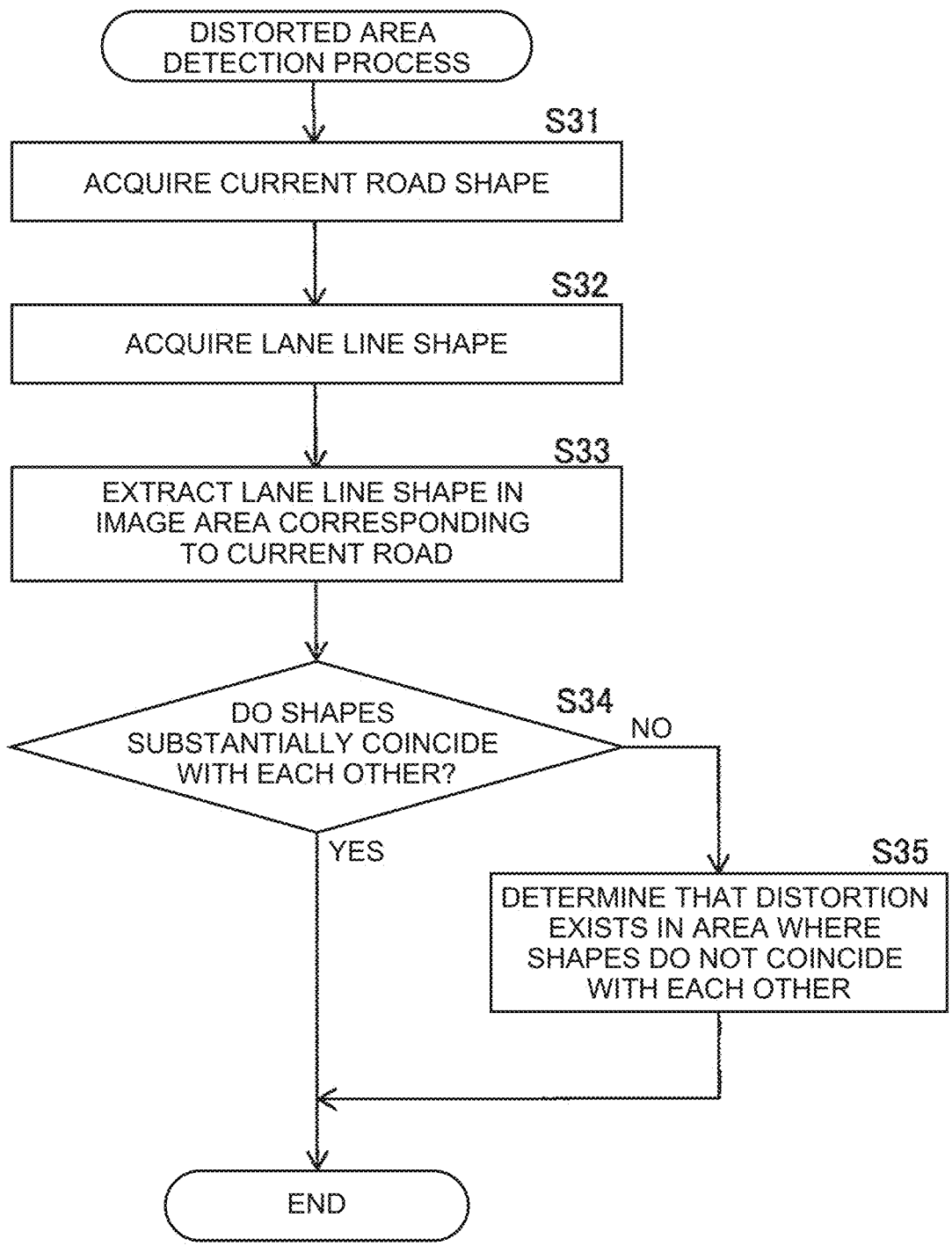
FIG. 8 is a flowchart illustrating a distorted area detection process.

FIG. 8 is a flowchart illustrating the distorted area detection process that is performed at step S14 in FIG. 6. The distorted area detection process illustrated in FIG. 8 is performed every time the flowchart of FIG. 6 reaches step S14.

First, at step S31, the distorted area detection unit 33 acquires the current road shape estimated by the road shape estimation unit 32 at step S13 in FIG. 6. Then, at step S32, the distorted area detection unit 33 acquires the shapes of the lane line detected by the lane line shape detection process performed at step S12 in FIG. 6. In particular, in this embodiment, the distorted area detection unit 33 acquires the shapes of the lane lines shown in the images that were captured for past n seconds.

Then, at step S33, the distorted area detection unit 33 extracts the shapes of the lane lines at the defined portions of the images corresponding to the road on which the vehicle 1 is currently traveling. For example, the distorted area detection unit 33 extracts the shape of the lane line shown at the lowermost portion (portion P1 in FIG. 4) of the image captured a second ago, and the shape of the lane line shown at the second portion from the bottom (portion P2 in FIG. 4)

of the image captured two seconds ago. Likewise, the distorted area detection unit 33 extracts the shape of the lane line shown at the n-th portion from the bottom of the image captured n seconds ago.

The relationship between the time from imaging and the position in an image is adjusted based on the speed of the vehicle 1, the slope of a road on which the vehicle 1 is traveling, and the like. Specifically, the relationship between the time from imaging and the position in an image is adjusted so that portions of a road shown in the image correspond to a road on which the vehicle 1 is currently traveling. Therefore, when the speed of the vehicle 1 is fast, the time from imaging is adjusted relatively short.

Then, at step S34, the distorted area detection unit 33 determines whether or not the current road shape acquired at step S31 substantially coincides with the corresponding shape of the lane line extracted at step S33. Specifically, for example, when the ratio between the curvature in the current road shape and the curvature in the shape of the lane line is a predetermined threshold value or less, it is determined that both shapes substantially coincide with each other.

When it is determined at step S34 that the current road shape and the shape of the lane line coincide with each other in all the images, the control routine is ended. On the other hand, when it is determined at step S34 that the current road shape and the shape of the lane line do not coincide with each other in part of the images, the control routine proceeds to step S35.

At step S35, the distorted area detection unit 33 determines that, in the image in which the shape of the lane line does not coincide with the current road shape, local distortion is generated in an area where the lane line concerned is shown. For example, when it is determined at step S34 that the shape of the lane line shown at the second portion from the bottom (portion P2 in FIG. 4) of the image captured two seconds ago does not coincide with the road shape, the distorted area detection unit 33 determines at step S35 that local distortion is generated at the second portion from the bottom of the image in an area where the lane line concerned is shown.

Effects

According to the embodiment described above, a distorted area is detected based on not only a lane line shown in an image captured by the in-vehicle camera 2, but also a shape of a road, on which the vehicle 1 is traveling, that is estimated based on an output of a detector other than the in-vehicle camera 2. Therefore, it is possible to properly diagnose an abnormality such as a distorted area in an image captured by an in-vehicle camera.

Modifications

While the embodiment according to the present disclosure has been described above, various alterations and changes can be made to the above-described embodiment.

For example, in the above-described embodiment, the lane line shape detection unit 31 is configured to detect not only a straight line, but also a figure of an arbitrary shape other than a straight line. Alternatively, the lane line shape detection unit 31 may be configured to detect only a straight line. In this case, an abnormality diagnosis is performed only when the vehicle 1 is traveling on a straight road, while an abnormality diagnosis is not performed when the vehicle 1 is traveling on a curve. In this case, since the lane line shape detection unit 31 detects a straight line based on edge components by the Hough transform, i.e. not by the generalized Hough transform, it is possible to suppress the computation load in the lane line shape detection unit 31 to be low.

In the above-described embodiment, the lane line shape detection unit 31 detects a shape of a lane line every time an image is transmitted from the in-vehicle camera 2. However, for example, when the lane line shape detection unit 31 is configured to detect only a straight line as described above, all images captured by the in-vehicle camera 2 may be temporarily stored in the memory 22, and only when the shape of a road, on which the vehicle 1 is currently traveling, estimated by the road shape estimation unit 32 is straight, the lane line shape detection unit 31 may detect shapes of lane lines for the images for past several seconds. In this case, since it is not necessary to perform a lane line shape detection process for all images transmitted from the in-vehicle camera 2, it is possible to suppress the computation load in the lane line shape detection unit 31 to be low.

In the above-described embodiment, the distorted area detection unit 33 makes a comparison between a current road shape estimated by the road shape estimation unit and a shape of a lane line shown in a past image. However, the distorted area detection unit 33 may make a comparison between a past road shape estimated by the road shape estimation unit and a shape of a lane line shown in a past image. Even in this case, however, it is necessary that the distorted area detection unit 33 make a comparison between a shape of a lane line on a road, on which the vehicle 1 was traveling at a certain time point in the past, detected from a past image and a shape of a road on which the vehicle 1 was traveling at that certain time point in the past.

In the above-described embodiment, the in-vehicle camera 2 images a front area ahead of the vehicle 1, and the lane line shape detection unit 31 detects a shape of a lane line in an image of a road surface ahead of the vehicle 1. However, the in-vehicle camera 2 may image any areas around the vehicle. For example, the in-vehicle camera 2 may image a rear area behind the vehicle 1, and in this case, the lane line shape detection unit 31 detects a shape of a lane line in an image of a road surface behind the vehicle 1.

In the above-described embodiment, the distorted area detection unit 33 makes a comparison between a road shape estimated by the road shape estimation unit and a shape of a lane line shown in a past image. However, the distorted area detection unit 33 may project as a reference line a virtual lane line of a shape corresponding to a road shape estimated by the road shape estimation unit on each of past images, and when the distance between the projected reference line and a lane line shown in the past image is a predetermined threshold value or more, the distorted area detection unit 33 may determine that local distortion is generated in that area.

What is claimed is:

1. An imaging abnormality diagnosis device comprising:
one or more processors; and
a memory device storing instructions that are executable by the processors and that causes the processors to
detect a lane line in an image of a road surface captured by a camera mounted on a vehicle,
estimate a shape of a road on which the vehicle is traveling based on an output of a detector mounted on the vehicle, the detector being other than the camera, and
determine that an area in the image is a distorted area where the shape of the road and a shape of the lane line do not coincide with each other.

2. The imaging abnormality diagnosis device according to claim 1, wherein the road surface is a road surface ahead of or behind the vehicle.

3. The imaging abnormality diagnosis device according to claim 1, wherein the distorted area is an area where local distortion is generated in the image.

4. The imaging abnormality diagnosis device according to claim 1, wherein when the distorted area is detected while the vehicle performs at least one of a driving assistance process and autonomous driving, the at least one of the driving assistance process and the autonomous driving performed by the vehicle is stopped.

5. The imaging abnormality diagnosis device according to claim 1, wherein the instructions cause the processors to, when the distorted area is detected, output a warning message via an output interface, the warning message indicating that the distorted area is detected.

6. The imaging abnormality diagnosis device according to claim 1, wherein the instructions cause the processors to detect, by comparing the shape of the road and the shape of the lane line with each other, the area in the image where the shape of the road and the shape of the lane line do not coincide with each other as the distorted area.

7. The imaging abnormality diagnosis device according to claim 1, wherein the instructions cause the processors to:
   detect a straight lane line in the image; and
   compare the shape of the road and the shape of the lane line with each other when the vehicle is traveling on a straight road.

8. The imaging abnormality diagnosis device according to claim 1, wherein the instructions cause the processors to detect the lane line in the image when the vehicle is traveling on a straight road.

9. The imaging abnormality diagnosis device according to claim 8, wherein the instructions cause the processors to detect the lane line in the image when the shape of the road which is estimated is straight.

10. An imaging abnormality diagnosis device comprising one or more processors configured to:
   detect a shape of a lane line in an image of a road surface ahead of or behind a vehicle, the image captured by an in-vehicle camera;
   estimate a shape of a road on which the vehicle is traveling based on an output of a detector other than the in-vehicle camera; and
   determine an area in the image where the shape of the road and the shape of the lane line do not coincide with each other, as a distorted area where local distortion is generated in the image.

* * * * *

UNITED STATES PATENT AND TRADEMARK OFFICE
CERTIFICATE OF CORRECTION

Page 1 of 1

PATENT NO. : 11,295,429 B2
APPLICATION NO. : 16/690250
DATED : April 5, 2022
INVENTOR(S) : Masataka Yokota et al.

It is certified that error appears in the above-identified patent and that said Letters Patent is hereby corrected as shown below:

On the Title Page

Item [73], a second Assignee should be entered, as follows:
TOYOTA JIDOSHA KABUSHIKI KAISHA, Toyota (JP)
DENSO CORPORATION, Kariya-City (JP)

Signed and Sealed this
First Day of October, 2024

Katherine Kelly Vidal
*Director of the United States Patent and Trademark Office*